United States Patent
Collins

(10) Patent No.: US 11,223,081 B2
(45) Date of Patent: Jan. 11, 2022

(54) SERPENTINE COUNTER FLOW COLD PLATE FOR A VEHICLE BATTERY MODULE

(71) Applicant: Rivian IP Holdings, LLC, Plymouth, MI (US)

(72) Inventor: Tyler Collins, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 93 days.

(21) Appl. No.: 16/367,895

(22) Filed: Mar. 28, 2019

(65) Prior Publication Data

US 2020/0153062 A1    May 14, 2020

Related U.S. Application Data

(60) Provisional application No. 62/767,224, filed on Nov. 14, 2018.

(51) Int. Cl.
| | |
|---|---|
| *H01M 10/6568* | (2014.01) |
| *H01M 10/6555* | (2014.01) |
| *H01M 10/613* | (2014.01) |
| *H01M 10/625* | (2014.01) |
| *B60L 58/26* | (2019.01) |

(52) U.S. Cl.
CPC ......... *H01M 10/6568* (2015.04); *B60L 58/26* (2019.02); *H01M 10/613* (2015.04); *H01M 10/625* (2015.04); *H01M 10/6555* (2015.04)

(58) Field of Classification Search
CPC ........... H01M 10/6568; H01M 10/613; H01M 10/625; H01M 10/6555; H01M 10/6557
See application file for complete search history.

(56) References Cited

U.S. PATENT DOCUMENTS

| | | | |
|---|---|---|---|
| 9,531,045 B2 | 12/2016 | Girmscheid et al. | |
| 2010/0279152 A1* | 11/2010 | Payne | H01M 10/63 429/50 |
| 2013/0014923 A1* | 1/2013 | Girmscheid | H01M 10/625 165/168 |
| 2016/0248134 A1* | 8/2016 | Morse | H01M 10/6557 |

FOREIGN PATENT DOCUMENTS

DE    10 2015 216719    3/2017

OTHER PUBLICATIONS

International Search Report and Written Opinion of PCT/US2019/061418 dated Mar. 9, 2020.

\* cited by examiner

*Primary Examiner* — Osei K Amponsah
(74) *Attorney, Agent, or Firm* — Haley Guiliano LLP

(57) ABSTRACT

A battery module or battery pack is provided having a serpentine counter flow cold plate with improved dissipation of heat from individual battery cells, wherein the cold plate provides a more uniform temperature gradient across the cold plate to more evenly transfer heat from the battery cells to liquid coolant circulating through the cold plate. The cold plate selectively omits turbulator material upstream of turbulators to control and govern the coolant fed into and through the turbulators to provide a more uniform temperature gradient across the cooling surfaces.

15 Claims, 6 Drawing Sheets

SERPENTINE COUNTER FLOW COLD PLATE FOR A VEHICLE BATTERY MODULE

CROSS REFERENCE TO RELATED APPLICATIONS

This application claims priority of U.S. Provisional Patent Application 62/767,224, filed Nov. 14, 2018, the disclosure of which is incorporated herein by reference in its entirety.

FIELD OF THE INVENTION

The invention relates to a vehicle battery module or battery pack having multiple battery cells, and more particularly to a cold plate for cooling the battery cells during operation.

BACKGROUND OF THE INVENTION

Electric vehicles are typically powered by at least one battery module or battery pack, which incorporates a plurality of battery cells disposed one adjacent to the other. During operation, the charge and discharge of the battery cells can generate heat, which in excess can negatively affect battery performance and lifespan. As such, known battery modules may include cooling devices to transfer and dissipate heat from the battery cells to maintain a stable operating temperature for the batteries. Such cooling devices include various configurations of heat exchangers, wherein one type of heat exchanger is a cold plate that is liquid-cooled and has a plate-like configuration that is positioned adjacent to a plurality of batteries to draw heat therefrom. The liquid coolant, which preferably may be a 50/50 WEG coolant or another suitable fluid that transfers heat, then circulates between the cold plate and a cooling system, such as the cooling system of a vehicle. As the coolant circulates through the cold plate, the coolant draws the heat from the battery module and dissipates the heat through the vehicle cooling system or other similar cooling system.

While cold plates generally function to remove heat from the battery modules, it is an object of the invention to provide an improved cold plate which provides a more uniform removal of heat from each battery cell to avoid significant differences in temperature within the individual batteries.

SUMMARY OF THE INVENTION

The invention relates to an inventive battery module or battery pack having improved dissipation of heat from individual battery cells, and further relates, to an improved cold plate which provides a more uniform temperature gradient across the entire top and bottom cooling surfaces of the cold plate to more evenly transfer heat from the battery cells to liquid coolant circulating through the cold plate. The improved temperature gradient provides a more uniform removal of heat from each of the individual battery cells, which can provide improved battery performance and battery life as well as other advantages associated therewith.

The inventive cold plate generally has a plate-like configuration which is enlarged face-wise on opposite side surfaces of the cold plate. These side surfaces define cooling surfaces and may contact and support one or more, and preferably a large plurality of battery cells disposed one adjacent to the other on a respective cooling surface. In the preferred embodiment, a group of battery cells are coupled to each of the cooling surfaces so that the cold plate functions to cool two groups of battery cells. The combination of the cold plate and one or more groups of battery cells typically are assembled together by suitable support structure or materials to thereby form an integrated battery module that is usable in electric vehicles. It will be understood that the present invention is developed for use in an electric vehicle although the inventive concepts disclosed herein are usable in cold plates and battery modules provided for other types of battery-powered electrical equipment.

In more detail, the cold plate includes an open interior which is subdivided into an interior coolant channel extending between an inlet and outlet to absorb heat from the cooling surfaces. The coolant channel is formed in a pattern defined by multiple channel sections that form a serpentine counter flow path through the cold plate, which provides improved dissipation of heat from individual battery cells. In this regard, the cold plate provides a more uniform temperature gradient across the cold plate to more evenly transfer heat from the battery cells to liquid coolant circulating through the cold plate.

The cooling channel comprises a plurality of channel sections that define the serpentine counter flow pattern preferably having four paths, i.e. the flow paths extending along four parallel channel sections. As the coolant flows along this tortuous path, the coolant receives heat from each or both of the cooling surfaces to draw and remove heat from the individual battery cells. In the preferred pattern, the coolest channel section is at the inlet and is located adjacent and parallel to the warmest channel section at the outlet, which allows the two adjacent and parallel coolant channels to exchange heat and provide a more uniform temperature gradient.

In one aspect, portions of the cooling channel include turbulators or fins which increase heat transfer between the cooling surfaces and the coolant. The turbulators increase heat transfer from the surfaces of the cold plate to the fluid by increasing the amount of surface area of coolant in contact with the highly thermally conductive aluminum and also creating a more turbulent flow or tortuous path which breaks up the boundary layer. In order to reduce the temperature gradient across the surfaces of the cold plate the cooling effect of the cold incoming coolant is reduced. To reduce this cooling power, the turbulators are removed from the first portion of the flow path which decreases heat transfer from the surface into the coolant. This causes the surfaces above and below this turbulator-free area to be warmer than if it had turbulator therein, which thereby decreases the difference in surface temperature compared to the immediately adjacent counterflow path since the adjacent counterflow path has coolant that is farther downstream such that the coolant has absorbed more heat. To achieve a more uniform temperature gradient, the inventive cold plate is also provided with an improved flow of coolant, particularly from the inlet prior to entry into the first turbulator. Most preferably, the inlet opens into a channel section upstream of the turbulators, wherein this upstream channel section is free of turbulators which reduces the heat transfer coefficient in this area thereby reducing the temperature differential between the warmest outlet area and the coolest inlet area. This also allows a less restricted flow rate of fluid and generates less turbulence along this channel section in comparison to the flow through the turbulators. This allows for flow which may be faster and less turbulent in an inlet area that is relatively cold. This arrangement further improves the temperature gradient over the cooling surfaces, wherein the cold plate selectively omits turbulator material in a portion of the coolant channel upstream of turbulators.

Other objects and purposes of the invention, and variations thereof, will be apparent upon reading the following specification and inspecting the accompanying drawings.

Figure 1:
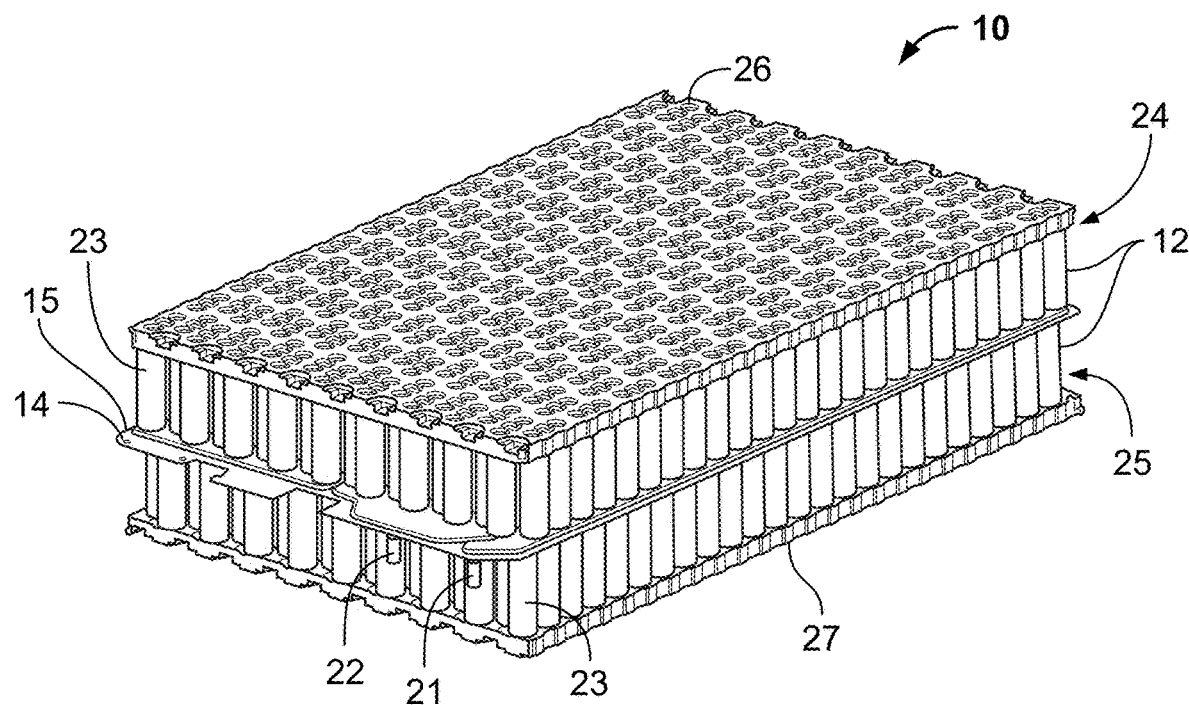
FIG. 1 is a perspective view of a battery module as taken from an upper right front corner illustrating first and second groups of battery cells coupled to opposite cooling surfaces of a cold plate.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, an inventive battery module or battery pack 10 is shown with a configuration providing improved dissipation of heat from individual battery cells 12. The battery module 10 includes an improved cold plate 14 which provides a more uniform temperature gradient across the length and width of the cold plate 14 to more evenly transfer heat from the battery cells 12 to liquid coolant circulating through the cold plate 14. The improved temperature gradient provides a more uniform removal of heat from each of the individual battery cells 12, which can provide improved battery performance and battery life as well as other advantages associated therewith.

Figure 2:
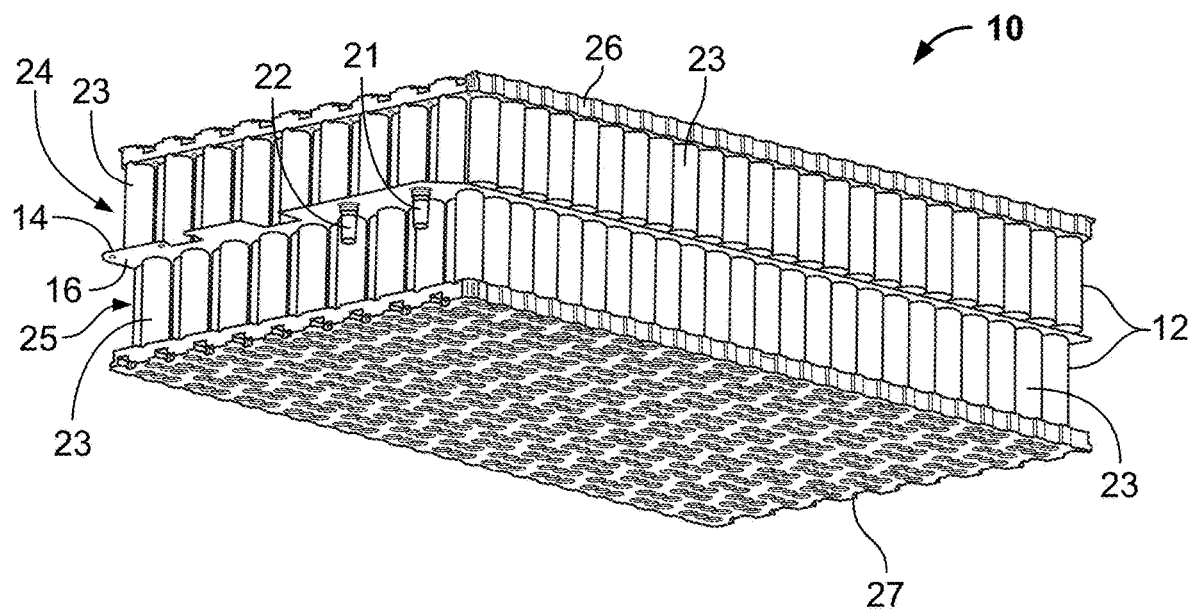
FIG. 2 is a perspective view of the battery module as taken from a lower right front corner illustrating the first and second groups of battery cells coupled to opposite cooling surfaces of the cold plate.
Figure 3:
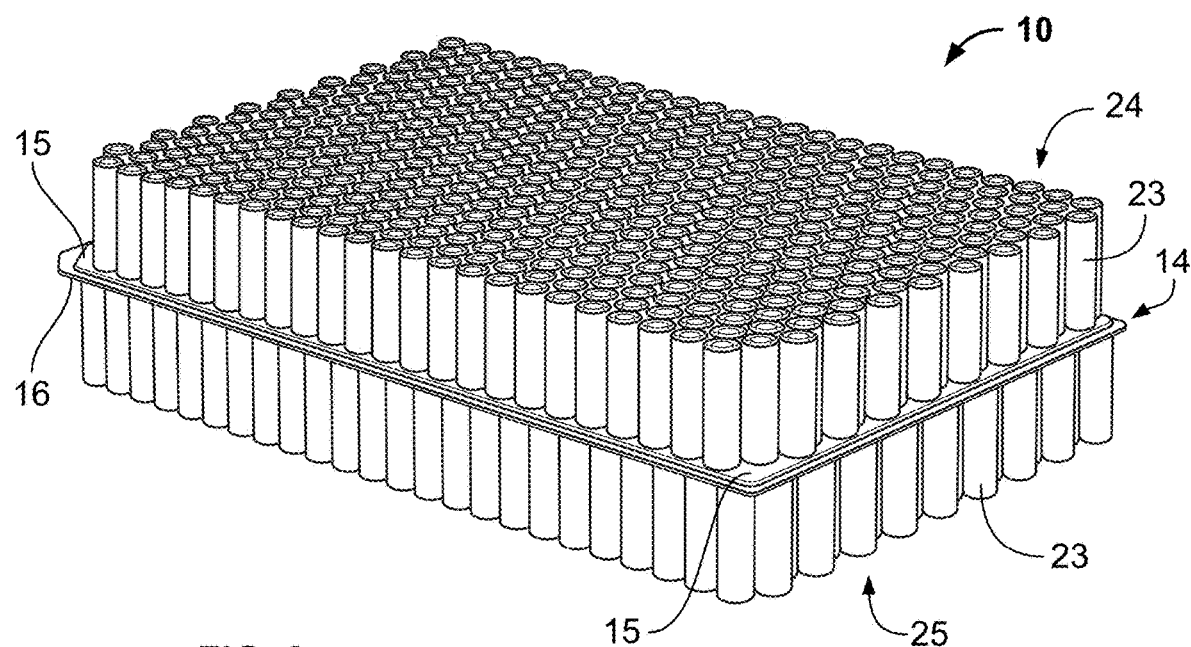
FIG. 3 is a perspective view of the battery module as taken from an upper right rear corner illustrating the first and second groups of battery cells coupled to opposite cooling surfaces of the cold plate.

In more detail with reference to FIGS. 1-3, the inventive cold plate 14 generally has a plate-like configuration which is enlarged face-wise on opposite side surfaces of the cold plate 14. These side surfaces define first and second cooling surfaces 15 and 16, which preferably are substantially planar and preferably are completely flat under cells 12 and face in opposite directions away from each other. In the illustrated orientation, the first and second cooling surfaces 15 and 16 might be referenced as upper and lower cooling faces although the battery module 10 may be oriented in various orientations such that the terms upper and lower are not restricted to a particular vertical or horizontal orientation.

Figure 4:
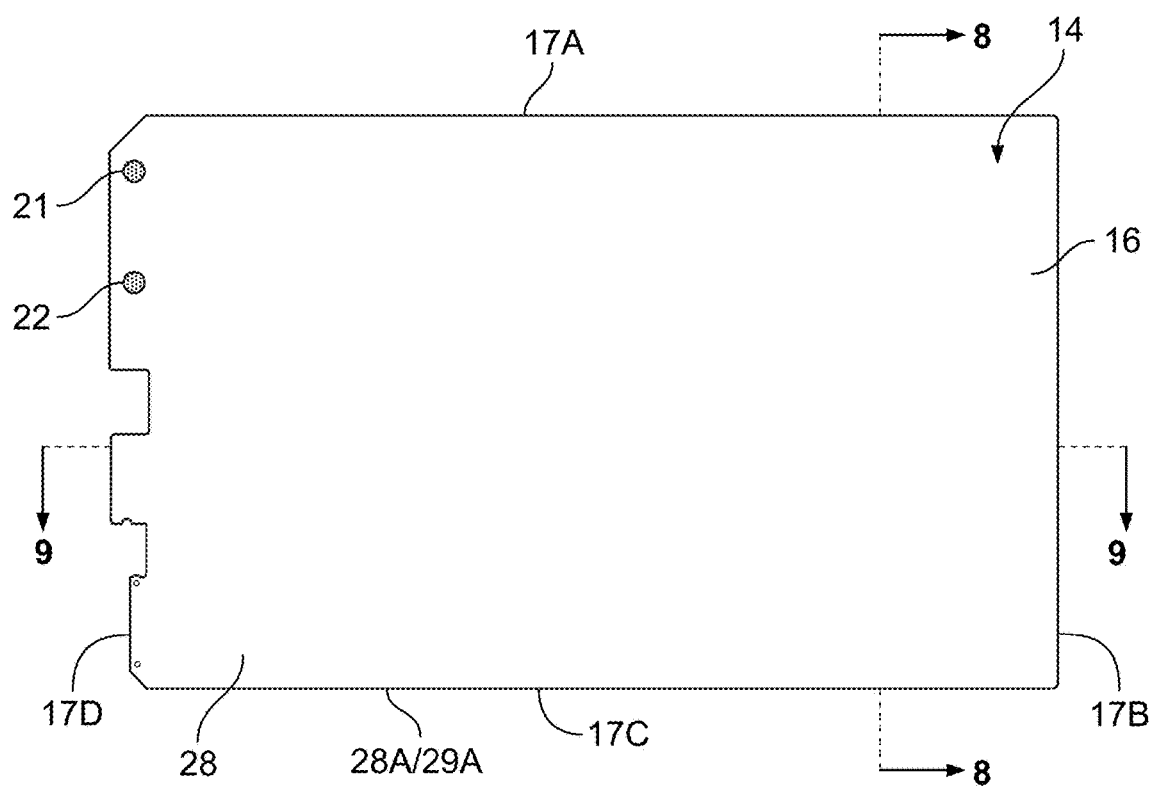
FIG. 4 is a bottom view of the cold plate.
Figure 5:
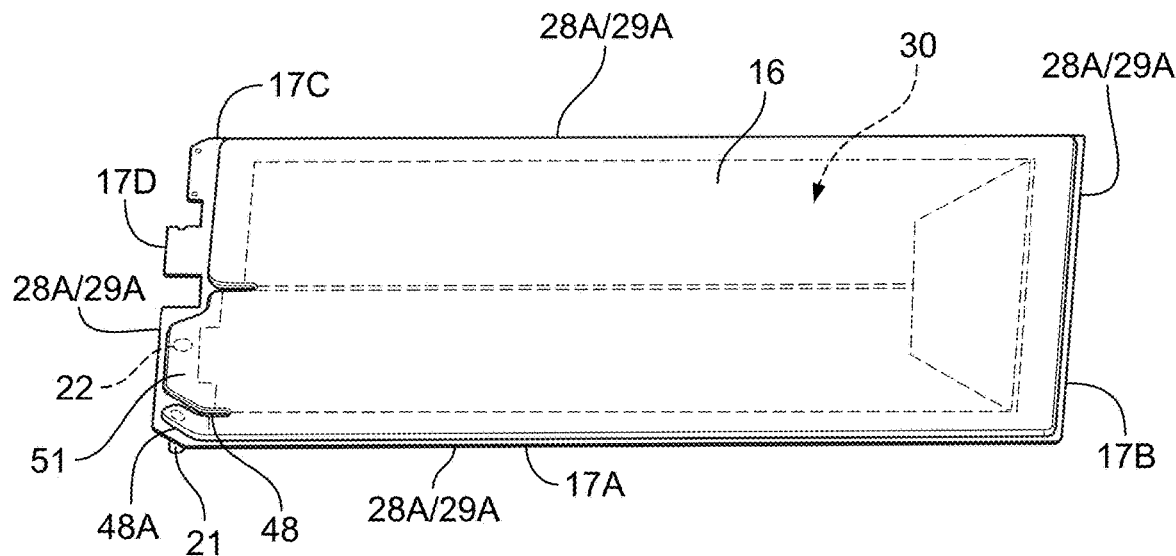
FIG. 5 is a side perspective view of the cold plate.

As best seen in FIGS. 4 and 5, the first and second cooling surfaces may and preferably are formed to be substantially planar and to extend across a substantial majority of the length and width of the of the cold plate 14. In the preferred configuration, the cold plate 14 is formed generally as a rectangle with a longer length than width although the length and width may be made proximate to each other to resemble a more square shape. Additionally, the peripheral edges 17A, 17B, 17C and 17D generally extend linearly in the lengthwise or widthwise directions although the specific shape may be non-linear provided the cold plate 14 performs pursuant to the disclosure herein. Further, the peripheral edge 17D at one end of the cold plate 14 includes clearance notches therein, although the specific formation of such edge 17D may vary.

Referring again to FIGS. 1 and 2, the cold plate 14 is generally hollow and includes an inlet port 21 and an outlet port 22 near the edge 17D. The inlet port 21 and outlet port 22 are configured to connect to and form part of a cooling system such as a cooling system for a vehicle. The inlet port 21 and outlet port 22 serve as connectors which interconnect to other components of the cooling system and are configured to receive and discharge a coolant and preferably, a liquid coolant into and out of the cold plate 14. In operation, the coolant circulates between the cold plate 14 and other components of a cooling system, such as the cooling system of a vehicle. As the coolant circulates through the cold plate 14, the coolant receives heat generated within the battery module 10 for subsequent dissipation through the vehicle cooling system or other similar cooling system. As described herein, the cold plate 14 is configured to provide more uniform removal of heat to avoid significant differences in temperature and reduce temperature gradients across the area of the cooling surfaces 15 and 16.

Referring to FIGS. 1-3, each cooling surface 15 and/or 16 is configured to couple to one or more battery cells 23 disposed on a respective cooling surface 15 or 16. In the preferred embodiment, multiple battery cells 23 are coupled to each of the cooling surfaces 15 and 16 so that the cold plate 14 functions to cool first and second groups of battery cells 24 and 25. The assembly of the cold plate 14 and one or more groups of battery cells 24 and/or 25 typically are assembled together by suitable support structure or materials such as support panels 26 and 27 to thereby form an integrated battery module 10 usable in various types of electrical devices including electric vehicles. It will be understood that the present invention is developed for use in an electric vehicle although the inventive concepts disclosed herein are usable in other types of battery-powered electrical equipment.

Preferably, the cold plate 14 includes both the first group 24 of battery cells 23 coupled to the cooling surface 15 and the second group 25 of battery cells 23 coupled to the opposite cooling surface 16. As such, the heat generated in each battery cell 23 is drawn toward the cold plate 14 which serves as a heat sink. A suitable thermal interface material (TIM) may be used to join the battery cells 23 to the cooling surfaces 15 and 16 and facilitate the transfer of heat from each battery cell 23 to the cold plate 14 during heat generation. As noted above, the coolant then receives or draws this heat through the thickness of the cooling surfaces 15 and 16 for subsequent cooling by the cooling system. As described hereinafter, the cold plate 14 is configured to provide improved cooling across the area of each cooling surface 15 and 16 to more uniformly dissipate heat, reduce temperature gradients across the length and width of the cooling surfaces 15 and 16 and thereby reduce the formation of hotspots within the groups 24 and 25 of battery cells 23.

Figure 6:
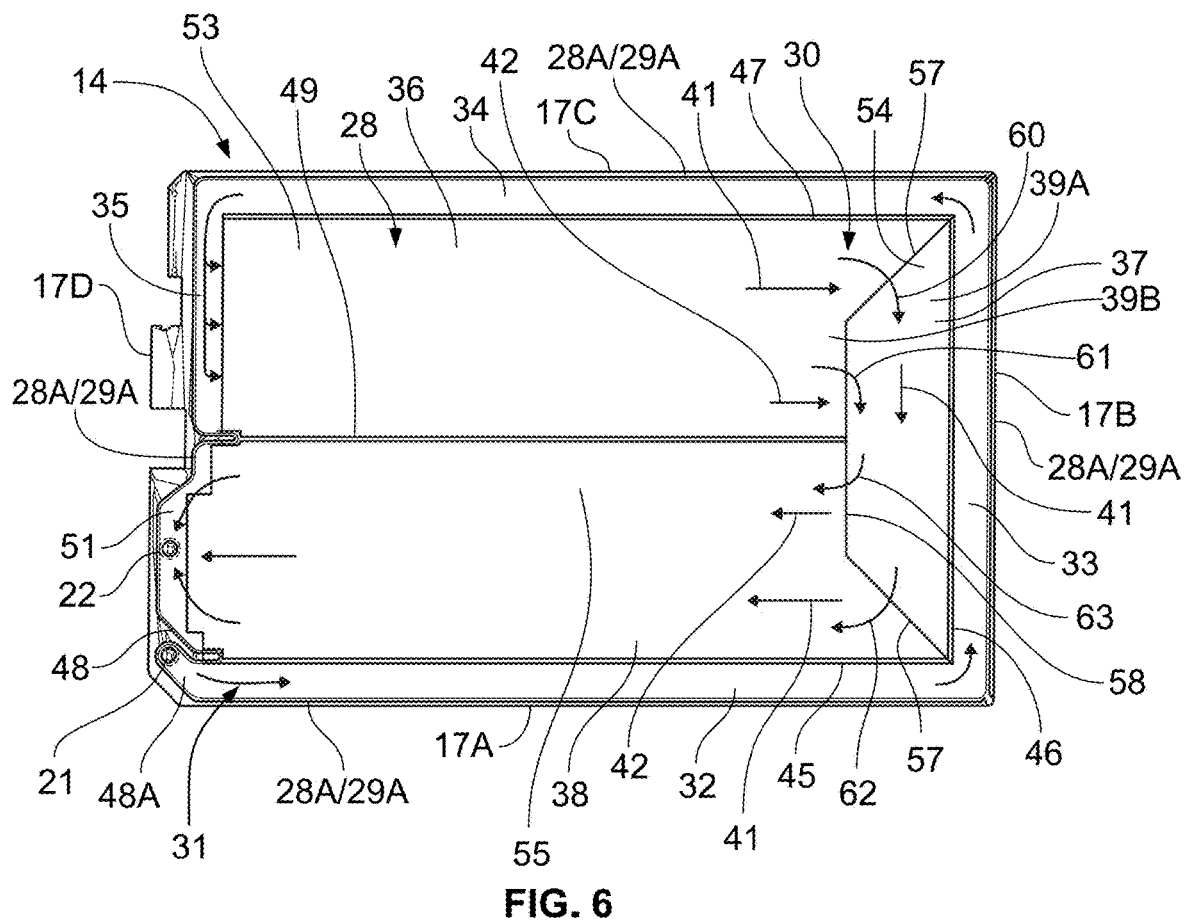
FIG. 6 is a top cross-sectional view of the cold plate.

Generally referring to FIGS. 5 and 6, FIG. 5 is a side perspective view of the cold plate 14 with interior structure shown in phantom outline to show the flow paths through the cold plate 14. FIG. 6 is a top cross-sectional view of the cold plate 14 which shows the interior structure in more detail as will be described further below.

Figure 7:
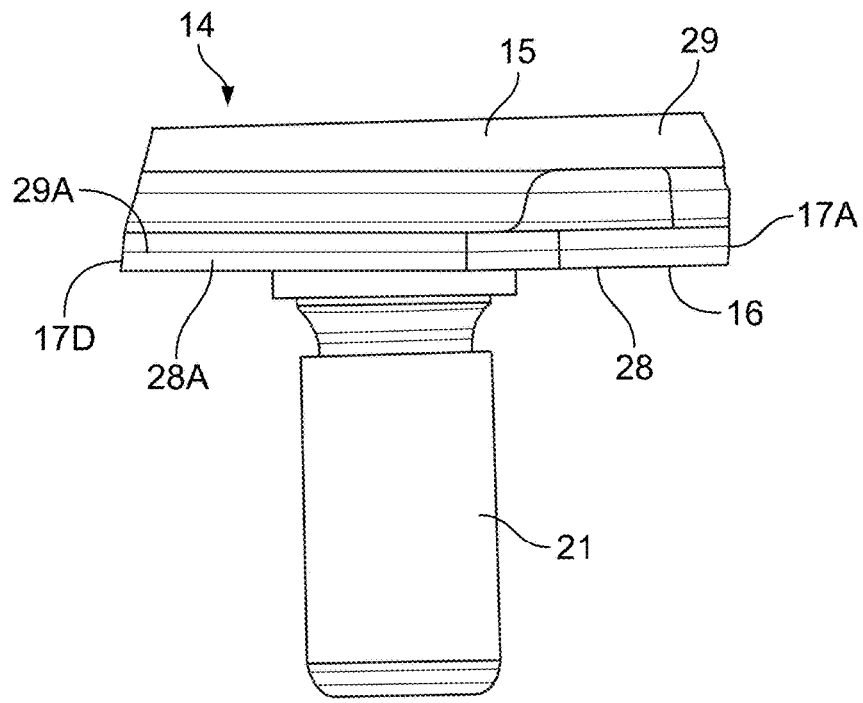
FIG. 7 is an enlarged fragmentary view of an inlet port for the cold plate.
Figure 8:
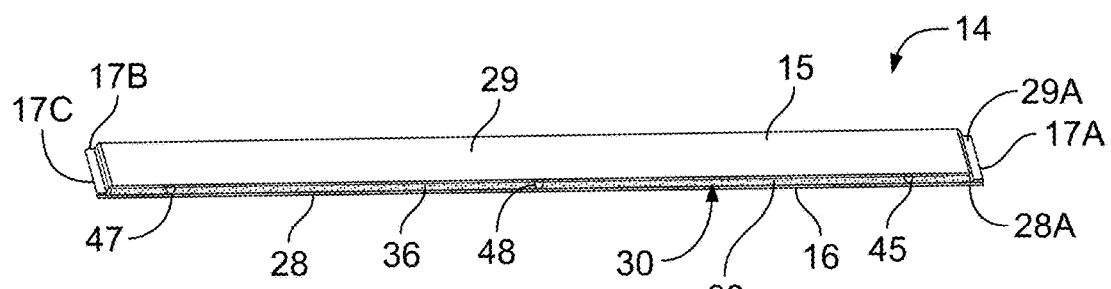
FIG. 8 is a front cross-sectional view of the cold plate as taken along line 8-8 of FIG. 4.
Figure 9:
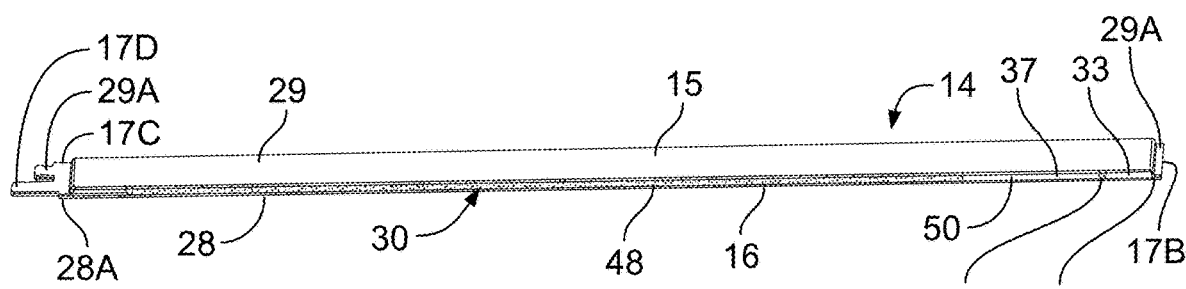
FIG. 9 is a side cross-sectional view of the cold plate as taken along line 9-9 of FIG. 4.

Turning next to FIGS. 7-8, the cold plate 14 may be formed of different constructions but preferably is formed by a lower or bottom housing plate 28, which is substantially planar or flat to form the second cooling surface 16, and an upper or top housing plate 29, which is shaped such as by stamping to form the first cooling surface 15. The lower housing plate 28 and upper housing plate 29 have respective peripheral edges 28A and 29A which abut together as best seen in FIG. 7 and also seen in FIGS. 8 and 9. The peripheral edges 28A and 29A are fixed and sealed together such as by brazing or other fastening processes wherein an interior chamber 30 is formed within the assembled lower and upper housing plates 28 and 29. As a result, the interior chamber 30 is defined between the lower and upper housing plates 28 and 29 and bounded or surrounded by the peripheral edges 28A and 29A.

While the interior chamber 30 generally conforms to substantially the entire area of the cold plate 14, the interior chamber 30 is subdivided into a multi-path interior coolant channel 31 extending between the inlet port 21 and outlet port 22 to absorb heat from the cooling surfaces 15 and 16. The coolant channel 31 is formed in a multi-path pattern defined by multiple channel sections 32-38 that flow one into the other to form a serpentine counter flow pattern through the interior chamber 30 of the cold plate 14.

Figure 10:
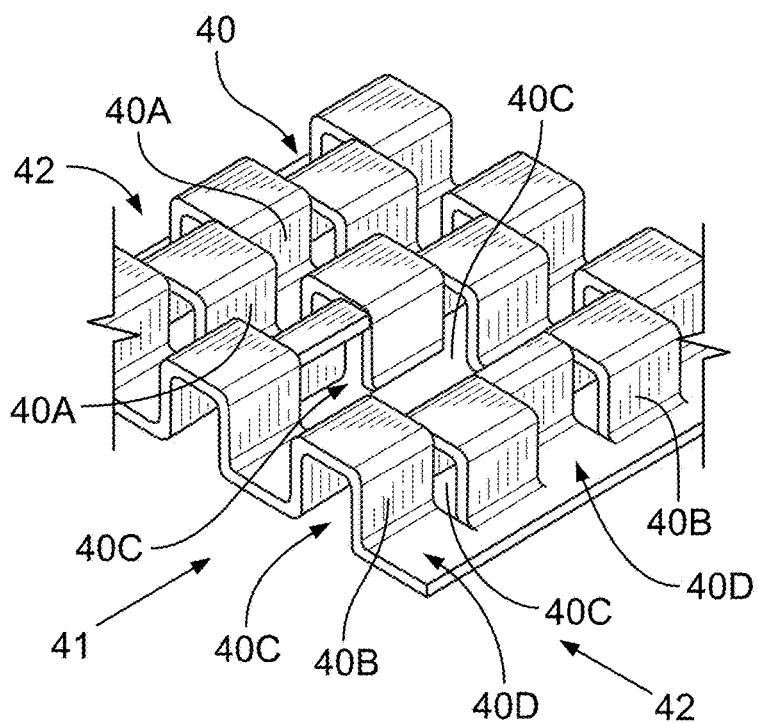
FIG. 10 is a partial, enlarged perspective view of a section of a turbulator disposed within the cold plate.

To form the channel sections 32-38 and generate turbulent flow within portions of the coolant channel 31, inserts 39A and 39B comprising trapezoidal portion 39A and rectangular portion 39B are mounted within the interior chamber 30 to subdivide the interior chamber 30 into the individual channel sections 32-38 of the coolant channel 31. Preferably, the inserts 39A and 39B are formed of a turbulator material so that the inserts 39A and 39B function as turbulator inserts or turbulators along select portions of the coolant channel 31. FIG. 10 illustrates a section 40 of one form of a turbulator material configured with a pattern commonly referred to as a lanced offset fin. The inserts 39A and 39B form an insert arrangement that may be formed by multiple structural parts or even as a single piece.

In a lanced offset fin turbulator as seen in FIG. 10, the turbulator section 40 is comprised of hat-shaped fins 40A which include fin walls 40B that define passages 40C that generally align longitudinally to define a primary flow direction 41 in which fluid may most easily flow through the turbulator section 40. Preferably, the turbulator section 40 is formed of a one-piece, flat metal sheet that is rolled through a forming machine that produces the lanced and offset fins 40A. As can be seen, the fins 40A are offset, which still permits flow in the primary flow direction 41 but which also define side passages 40D that allow fluid to enter sidewardly into the flow passages 40C from a secondary flow direction 42. The secondary flow direction 42 is impeded to a greater degree than the primary flow direction 41 but fluid is still able to enter the fins 40A from the secondary flow direction 42 and then redirect to the primary flow direction 41. This feature facilitates flow through the insert 39A as described in more detail herein.

Referring to FIGS. 5 and 6, the interior chamber 30 is subdivided by channel walls 45, 46 and 47 to define the passage sections 32, 33 and 34. The first channel wall 45 begins at a stamped inlet wall section 48 formed by the housing plate 29. The inlet wall section 48 forms a short inlet channel 48A that is fed by coolant received from the inlet port 21 and supplies the coolant to the first passage section 32.

The first channel wall 45 extends almost the length of the interior chamber 30 and joins with the second channel wall 46 to form a right angle turn so that the first channel section 32 feeds coolant downstream to the second channel section 33. In turn, the third channel wall 47 extends along most of but not all of the length of the cold plate 30 to form the third channel section 34, which opens downstream into the fourth channel section 35 which in turn acts as a manifold to feed the fifth channel section 36. As such, the first and third channel sections 32 and 34 extend along opposite side edges of the cold plate 14 and are oriented parallel to each other.

To form the fifth and sixth channel sections 36 and 37, a central channel wall 49 extends back toward the end edge 17B along a partial length of the cold plate 14 so that a turbulator area is formed wherein the fifth channel section 36 flows downstream into the sixth channel section 37. In turn, the sixth channel section 37 flows into the seventh channel section 38, which extends back along the central channel wall 49 and ends at the outlet port 22 so that coolant can be discharged from the cold plate 14 and returned to the cooling system for cooling and recirculation back to the inlet port 21.

As seen in FIGS. 5 and 6, an outlet reservoir 51 is formed adjacent the outlet port 22 to receive heated coolant from the seventh channel section 38 and funnel the coolant to the outlet port 22. Notably, the first through seventh channel sections 32-38 define a serpentine counter flow pattern having multiple path sections, i.e. the flow paths along the channel sections, 32, 33, 34, 35, 36, 37 and 38. As the coolant flows along this tortuous path, the coolant receives heat from each or both of the cooling surfaces 15 and 16 to draw and remove heat from the individual battery cells 23. In this pattern, the coolest channel section 32 at the inlet port 21 is adjacent and parallel to the warmest channel section 38 at the outlet port 22 which provides a more uniform temperature gradient in this region of the cold plate 14. The heat transfer between the inlet channel section 32 and the outlet channel section 38 is minimal. However, a more uniform temperature gradient results from the placement of the turbulators defined by inserts 39A and 39B. In accord with the following discussion, not having turbulators in channel sections 32, 33, 34, and 35 decreases the heat transfer efficiency to make sure the battery cells 12 in contact with this portion of the cold plate are not "too cold". The turbulators in later channel sections 36, 37, 38 improve the heat transfer efficiency in these regions and allow for the battery cells 12 in contact with these channel sections 36, 37 and 38 to be cooled to a similar temperature as the battery cells 12 that are in contact with channel sections 32, 33, 34, and 35. Further, the interior region of the cold plate 14 is of a similar temperature gradient since the channel sections 36, 37, and 38 having captured more heat than the inlet channel sections 32, 33, 34, and 35. Notably, the channel sections 36, 37, 38 do not all necessarily capture more heat than inlet channel sections 32, 33, 34, 35. Rather, the placement of the turbulator material defined by the inserts 39A and 39B is the reason for the uniform temperature gradient. Technically, the temperature gradient at the inlet area will be relatively higher and the temperature gradient at the outlet area will be slightly lower due to the temperature of the coolant at the inlet port 21 being the coldest and the temperature at the outlet port 22 being hottest.

The amount of heat transfer from the cooling surfaces 15 and 16 to the coolant is also affected by the rate and turbulence of flow through the totality of the coolant channel 31. In this regard, three sections of turbulator material (see FIG. 10) are provided in the channel sections 36, 37 and 38, wherein these sections comprise a first turbulator 53 in the fifth channel section 36, a second turbulator 54 in the sixth channel section 37, and a third turbulator 55 in the seventh channel section 38, which are aligned end to end in fluid communication with each other. These turbulators 53, 54 and 55 preferably are formed of the lanced fin turbulator pattern of FIG. 10 wherein the primary flow directions 41 are oriented at right angles in a U-shaped flow pattern.

To facilitate fluid flow, the second turbulator 54 located in the sixth channel section 37 is cut into a trapezoid shape so as to have angled end edges 57 with a side edge 58 extending therebetween. In this manner, the fluid flow in the primary flow direction 41 in the upstream turbulator 53 can flow most easily into the angled end edges 57 and redirect to the primary flow direction 41 of the trapezoid-shaped turbulator 54 as indicated by reference arrow 60. Since the trapezoid turbulator 54 also accepts flow from the secondary flow direction 42, additional flow is received through side edge 58 of the trapezoid turbulator 54 as indicated by reference arrow 61 which redirects to the primary flow direction 41. Notably, the secondary flow direction 42 has more flow resistance, i.e. it is more difficult for coolant to flow into the trapezoidal region 37 from the straight side edge 58 thereof rather than flowing in through the angled end edge 57, which encourages coolant to flow along the primary flow direction 41 and prevents heat spots that occur from having starved areas along the cold plate/flow paths.

The trapezoid turbulator 54 discharges in a similar manner wherein the flow in the primary flow direction 41 turns as indicated by arrow 62 to then flow through the outlet turbulator 55 along the primary flow direction 41 thereof. Also, coolant flow exits the trapezoid turbulator 54 through the side edge 58 in the second flow direction 42 and follows the flow path indicated by arrow 63. The net effect of the three turbulators 53, 54 and 55 is to create turbulent flow and a resistance to flow that facilitates heat transfer into the coolant.

To improve the heat transfer into the coolant, the inventive cold plate 14 is also provided with an improved flow of coolant, particularly from the inlet port 21 until entry into the first turbulator 53. In this regard, the inlet port 21 is preferably provided with less resistance to fluid flow in comparison to the resistance to flow created by the turbulators 53, 54, and 55. Most preferably, the inlet port 21 opens into the first channel section 32, wherein the first channel section 32 is unrestricted and allows a free flow of fluid along the channel section 32. The walls of the channel section 32 are relatively smooth so as to facilitate flow therethrough. The inlet has the coldest incoming fluid. Since there is no turbulator in the inlet section, the cold fluid is "less effective", wherein it is preferred that the cold plate 14 is not as cold in this inlet section as it would be if a turbulator was present to allow for a more uniform temperature differential. The absence of a turbulator or turbulator material increases the thermal resistance in these regions. This arrangement decreases thermal efficiency at the inlet port 21 and in those channels 32-35 without a turbulator and increases thermal efficiency in subsequent channels 36-38 with turbulators. This decreased thermal efficiency is accomplished by omitting the turbulator or fin material at the inlet port 21, and preferably along the length of the inlet channel section 32. Further, the turbulator or fin material may also be omitted from the subsequent downstream channel sections 33, 34 and even 35 to facilitate laminar fluid flow to remove heat transfer at a relatively lower rate to avoid too much cooling from inlet coolant such that the temperature gradient between the coolant and the battery cells 12 is relatively constant.

By selectively omitting turbulator material upstream of the turbulators 53, 54 and 55, coolant flow is controlled and affected to thereby improve the temperature gradient across the length and width of the cold plate 14. Overall, the face-wise temperature gradient over the cooling surfaces 15 and 16 is reduced to provide more uniform temperature transfer away from the battery cells 23. Upon omitting the turbulator material from the upstream channel sections 32, 33, 34 and 35 fed by the inlet port 21, these channel sections 32, 33, 34 and 35 are preferably made narrower to prevent bulging of channel sections 32, 33, 34, 35 under pressure. By this configuration, the cold plate 14 provides an improved performance with a more uniform temperature gradient across the cooling surfaces 15 and 16. Additionally, this configuration avoids an excessive pressure drop between the inlet port 21 and outlet port 22.

As to the configuration of the channel walls 45, 46, 47 and 48, these walls may be formed into the inserts 39A and 39B wherein the turbulators 53, 54 and 55 form these channel walls 45, 46, 47 and 48.

Figure 11:
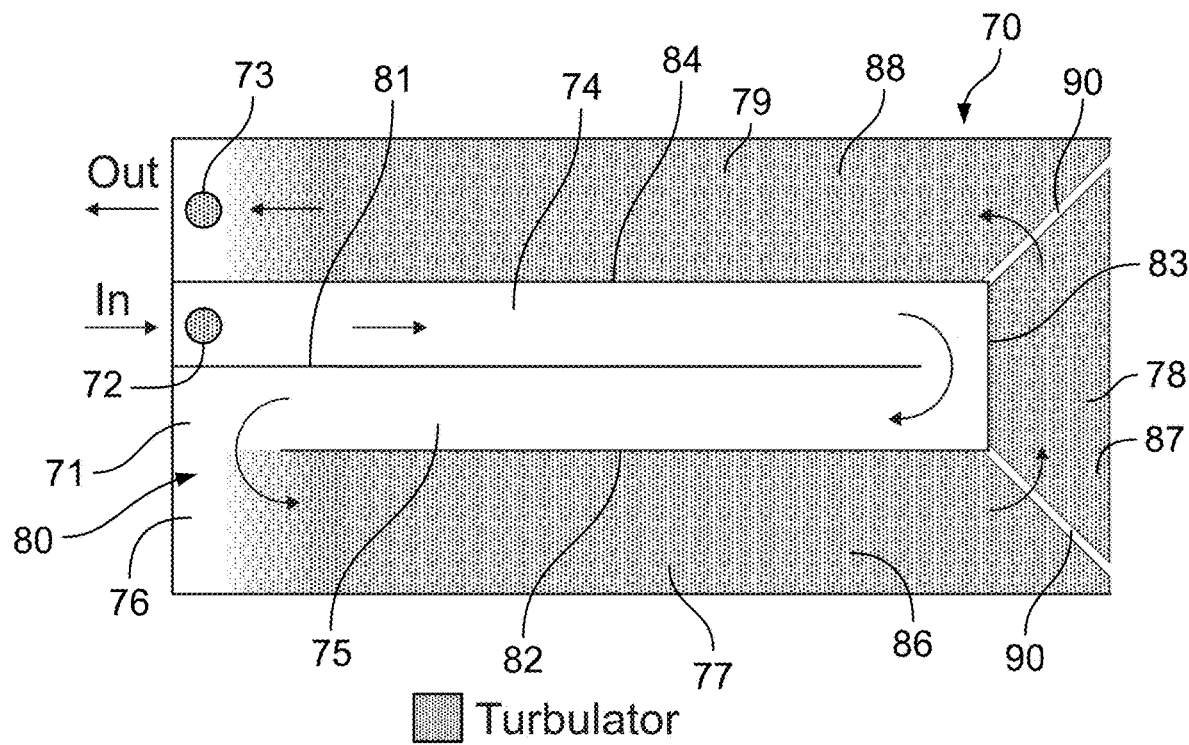
FIG. 11 is a top cross-sectional view of a second embodiment of the cold plate of the present invention.

In an alternative embodiment as seen in FIG. 11, the above-described construction may be modified to form a second embodiment of a cold plate 70 which is reconfigured to rearrange the pattern of the paths of a coolant channel 71. In view of the detailed discussion above, further discussion of the specific features of the cold plate 70 is not required. As diagrammatically shown, the cold plate 70 includes an inlet port 72 and outlet port 73.

Here again, a multi-path interior coolant channel 71 is provided extending between the inlet port 72 and outlet port 73 to absorb heat from the cooling surfaces, which are formed the same as cooling surfaces 15 and 16. The coolant channel 71 is formed in a multi-path pattern defined by multiple channel sections 74-79 that flow one into the other to form a second variation of a serpentine counter flow pattern through the interior chamber 80 of the cold plate 70.

To form the channel sections 74-79 and generate turbulent flow within portions of the coolant channel 71, the interior chamber 80 is subdivided by channel walls 81-84 to define the channel sections 74-79. The first channel wall 81 extends centrally to divide the channel sections 74 and 75, which are fed by coolant received from the inlet 72 and supplies the coolant to the first channel section 74, which in turn feeds the coolant section 75, which then feeds the channel sections 77, 78 and 79 in succession. In turn, the channel section 79 extends back along the channel wall 84 and ends at the outlet 73 so that coolant can be discharged from the cold plate 70 and returned to the cooling system for cooling and recirculation back to the inlet 72.

The first through fifth channel sections 74-79 define another variation of a serpentine counter flow pattern having four paths, i.e. the flow paths along the channel sections, 74, 75, 77 and 79. As the coolant flows along this tortuous path, the coolant receives heat from each or both of the cooling surfaces 15 and 16 to draw and remove heat from the individual battery cells 23. In this pattern, the coolest channel section 74 at the inlet 72 is adjacent to the warmest channel section 79 at the outlet 73 which provides a more uniform temperature gradient in this region of the cold plate 70. The heat transfer between the inlet channel section 74 and the outlet channel section 79 is very minimal. However, a more uniform temperature gradient results from the placement of the turbulators as described herein.

The amount of heat transfer from the cooling surfaces 15 and 16 to the coolant is also affected by the rate and turbulence of flow through the totality of the coolant channel 71. In this regard, three sections 86, 87 and 88 of turbulator material (see FIG. 10) are provided in the channel sections 77, 78 and 79. These turbulators preferably are formed of the lanced offset fin turbulator pattern of FIG. 10.

To facilitate fluid flow, the second turbulator 87 located in an open end area is cut into a trapezoid shape so as to have angled end edges 90. In this manner, the fluid flow in the primary flow direction in the upstream turbulator 86 can flow most easily into the angled end edges 90. The trapezoid turbulator 87 discharges in a similar manner wherein the flow in the primary flow direction turns to then flow through the outlet turbulator 88.

Here again, to improve the heat transfer into the coolant, this inventive cold plate 70 is also provided with an improved flow of coolant, particularly from the inlet 72 until entry into the first turbulator 86. In this regard, the inlet 72 opens into the first channel section 74, wherein the first channel section 74 is unrestricted and allows a free flow of fluid along the channel section 74. The walls of the channel section 74 are relatively smooth so as to facilitate flow therethrough. This allows for a faster and less turbulent flow which creates an inlet area that is relatively cold. This is accomplished by omitting the turbulator or fin material at the inlet 72, and preferably along the length of the inlet channel section 74. Further, the turbulator or fin material may also be omitted from the subsequent downstream channel sections 75 and 76 to facilitate fluid flow to the turbulators.

By selectively omitting turbulator material upstream of the turbulators 86-88, heat transfer is reduced and affected to thereby improve the temperature gradient across the length and width of the cold plate 70. Overall, the face-wise temperature gradient over the cooling surfaces is reduced to provide more uniform temperature transfer away from the battery cells 23. Upon omitting the turbulator material from the upstream channel sections 74-75 fed by the inlet 72, these channel sections 74-75 are preferably made narrower to prevent bulging under pressure, which turbulators are configured wider to accommodate the inlet flow of coolant. By this configuration, the cold plate 70 provides an improved performance with a more uniform temperature gradient across the cooling surfaces.

Figure 12:
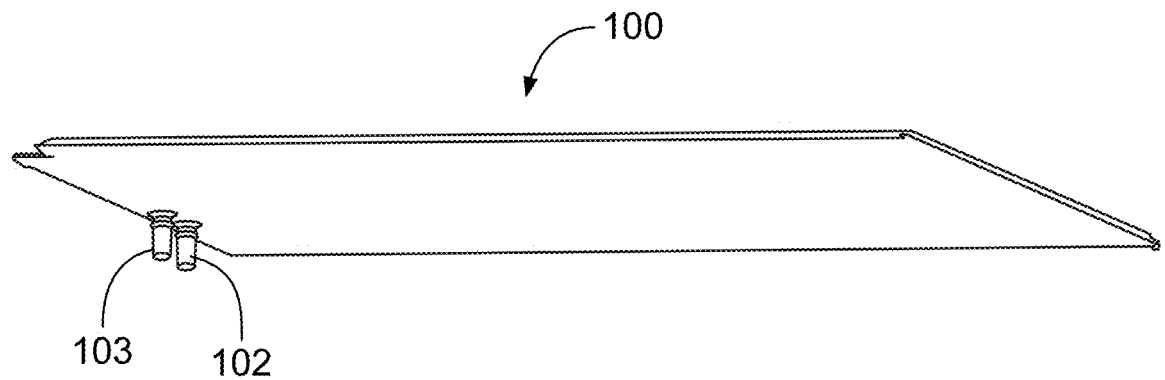
FIG. 12 is a bottom perspective view as viewed from the side of a third embodiment of the cold plate of the present invention.
Figure 13:
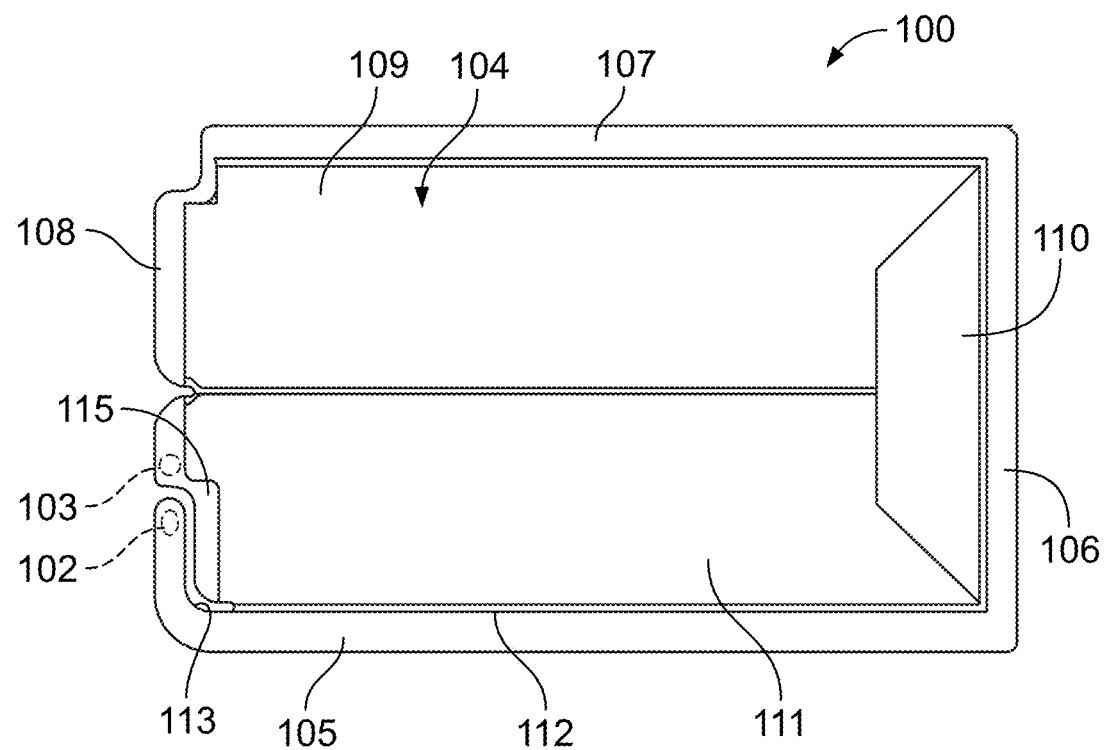
FIG. 13 is a bottom cross-sectional view of the cold plate of FIG. 13 which diagrammatically illustrates the location of the inlet and outlets in phantom outline.

Next, FIG. 12 is a bottom perspective view as viewed from the side of a third embodiment of the cold plate 100 of the present invention, wherein FIG. 13 is a bottom cross-sectional view of the cold plate 100 which diagrammatically illustrates the location of the inlet and outlets in phantom outline. In view of the detailed discussion above, further discussion of the specific features of the cold plate 100 is not required.

Generally, the cold plate 100 includes an inlet 102 and outlet 103. In this configuration of the cold plate 100, the cold plate 100 includes the same arrangement as described above relative to cold plate 14. Here again, a multi-path interior coolant channel 104 is provided extending between the inlet 102 and 103 to absorb heat from the cooling surfaces formed the same as cooling surfaces 15 and 16. The coolant channel 104 is formed in a multi-path pattern defined by multiple channel sections 105-111 that flow one into the other to form the same serpentine counter flow pattern present in cold plate 14. In this embodiment, the first channel wall 112 begins at a stamped inlet wall section 113 formed by a housing plate similar to the housing plate 29. The inlet wall section 113 forms a short inlet channel 114 that is fed by coolant received from the inlet 102 and supplies the coolant to the first passage section 105. In this embodiment, the short inlet channel 114 is longer than that described above and curves a farther distance toward the outlet 103. This reduces the size of the reservoir 115 at the outlet in comparison to the reservoir described above which funnels coolant flow to the outlet port 22.

Although particular preferred embodiments of the invention have been disclosed in detail for illustrative purposes, it will be recognized that variations or modifications of the disclosed apparatus, including the rearrangement of parts, lie within the scope of the present invention.

What is claimed:

1. A battery module comprising:
at least one battery cell; and
a cold plate having top and bottom plates coupled to each said battery cell and configured to circulate coolant through a coolant channel thereof, wherein said cold plate is configured to facilitate transfer of heat from said at least one battery cell to said top and bottom plates of said cold plate and to liquid coolant circulating through said cold plate;
said cold plate including an inlet port and an outlet port in fluid communication with said coolant channel to absorb heat from said top and bottom plates, said coolant channel comprising multiple channel sections to form a serpentine counter flow pattern, said channel sections comprising successive first, second, third and fourth channel sections, wherein said first channel section communicates with said inlet port, said fourth channel section communicates with said outlet port, and said first and fourth channel sections are in parallel adjacent relation to form a counterflow arrangement, said coolant channel including a turbulator downstream of said first channel section, wherein said first channel section is unrestricted and allows a free flow of said liquid coolant, and wherein coolant at said inlet port is cooler than at said outlet port.

2. The battery module according to claim 1, wherein said first channel section is free of a turbulator in a region proximate said inlet port.

3. The battery module according to claim 1, wherein said cold plate having a plate-like configuration which is defined by said top and bottom plates and which is enlarged face-wise on opposite side surfaces of the cold plate to define first and second cooling surfaces which transfer heat from said at least one battery cell to said coolant in said coolant channel.

4. The battery module according to claim 1, wherein said coolant channel is free of a turbulator in the region upstream of said turbulator.

5. The battery module according to claim 3, wherein said at least one battery cell comprises multiple battery cells coupled to at least one of said top and bottom plates.

6. The battery module according to claim 1, wherein said first channel section is disposed along a side edge of said cold plate, and said fourth channel sections is disposed inwardly adjacent thereto.

7. The battery module according to claim 1, wherein said fourth channel section is disposed along a side edge of said cold plate, and said first channel section is disposed inwardly adjacent thereto.

8. A cold plate for a battery module comprising:
a housing defining opposite cooling surfaces disposed on opposite sides of a coolant channel configured to circulate coolant through said coolant channel and draw heat away from said cooling surfaces and battery cells coupled thereto, wherein said cold plate is configured to facilitate the transfer of heat from the battery cells to liquid coolant circulating through said cold plate; and
said cold plate including an inlet port and an outlet port in fluid communication with said coolant channel to absorb heat from said cooling surfaces, said coolant channel comprising multiple channel sections to form a serpentine counter flow pattern, said coolant channel comprising successive first, second, third and fourth channel sections, wherein said first channel section communicates with said inlet port, said fourth channel section communicates with said outlet port, and said first and fourth channel sections are in parallel adjacent relation to form a counterflow arrangement, said coolant channel including a turbulator downstream of said first channel section, wherein said first channel section is unrestricted and allows a free flow of said liquid coolant, and wherein coolant at said inlet port is cooler than at said outlet port.

9. The cold plate according to claim 8, wherein said first channel section is free of a turbulator in a region proximate said inlet.

10. The cold plate according to claim 8, wherein said coolant channel is free of a turbulator in a region upstream of said turbulator.

11. The cold plate according to claim 8, wherein said first channel section is disposed along a side edge of said cold plate, and said fourth channel sections is disposed inwardly adjacent thereto.

12. The cold plate according to claim 8, wherein said fourth channel section is disposed along a side edge of said cold plate, and said first channel section is disposed inwardly adjacent thereto.

13. A battery module comprising:
a first group of battery cells arranged in an array;
a second group of battery cells arranged in an array; and
a cold plate configured to remove heat from the first group of battery cells and from the second group of battery cells, wherein the cold plate is arranged between the first group of battery cells and the second group of battery cells, and wherein the cold plate comprises:
a top cooling surface coupled to the first group of battery cells,
a bottom cooling surface coupled to the second group of battery cells, wherein the bottom cooling surface is arranged opposite the top cooling surface,
a first port,
a second port,
a coolant channel forming a serpentine flow pattern from the first port to the second port, wherein the coolant channel comprises first channel sections coupled to the first port and second channel sections coupled to the second port, and wherein the second channel sections are arranged outward of the first channel sections, and
at least one turbulator section configured to generate turbulent flow, wherein the at least one turbulator is arranged in only the first channel sections or the second channel sections of the coolant channel.

14. The battery module of claim 13, wherein:
the first port comprises an inlet port;
the second port comprises an outlet port; and
the turbulator is arranged in the second channel sections.

15. The battery module of claim 13, wherein:
the first port comprises an outlet port;
the second port comprises an inlet port; and
the turbulator is arranged in the first channel sections.

* * * * *